Aug. 6, 1940.  S. L. HANSEN  2,210,288
AUTOMOBILE BODY SUSPENSION DEVICE
Filed Dec. 15, 1938

INVENTOR
Sern L. Hansen
BY
Milburn & Milburn
ATTORNEYS.

Patented Aug. 6, 1940

2,210,288

UNITED STATES PATENT OFFICE 2,210,288

AUTOMOBILE BODY SUSPENSION DEVICE

Sern L. Hansen, Northfield, Ohio

Application December 15, 1938, Serial No. 245,972

1 Claim. (Cl. 267—20)

This invention relates to the art of suspension devices between the body and an axle of an automobile.

As is well known in the automobile industry, there has recently been initiated a departure from leaf springs to coil springs between the frame and axle. Such a change in the form of spring suspension has entailed the provision of some means to prevent side-wise movement of the body out of its normal, vertical position; and it is this particular feature upon which the present invention is an improvement. Obviously, the body must be kept level and free from side sway and roll.

Thus the object of my invention is to devise an improved means of connection between the frame and axle of an automobile whereby there will be permitted all necessary relative up-and-down movements therebetween, while at the same time there will be prevented any such side-wise movement of the body.

More specifically, my invention consists in effecting this arrangement by means of pivotal link couplings between the frame and axle, with an intermediate pivotal link connection between the inner ends of the companion couples, the couples being intended to permit the relative up-and-down movements between the frame and axle, while the intermediate link connection is for the purpose of preventing side-wise movement of the body, but without interfering with the up-and-down movements. This arrangement constitutes the specific aspect and object of my present invention, as will be more fully explained hereinafter.

Other objects will appear from the following description and claims when considered together with the accompanying drawing.

Figure 1:
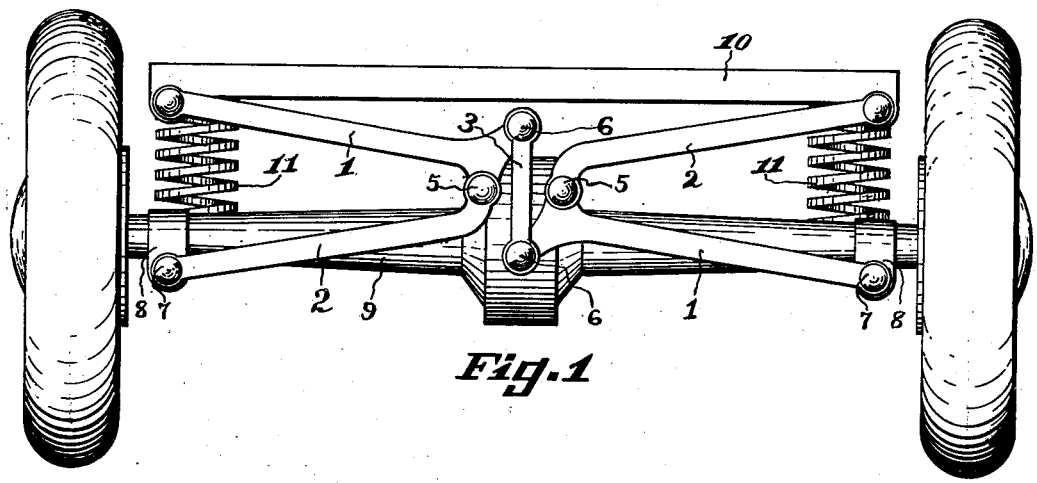
Fig. 1 is a rear elevation of my improved device.
Figure 2:
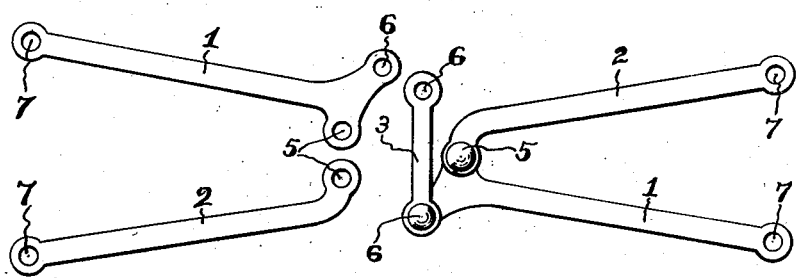
Fig. 2 shows the links in partially disassembled condition.
Figure 3:
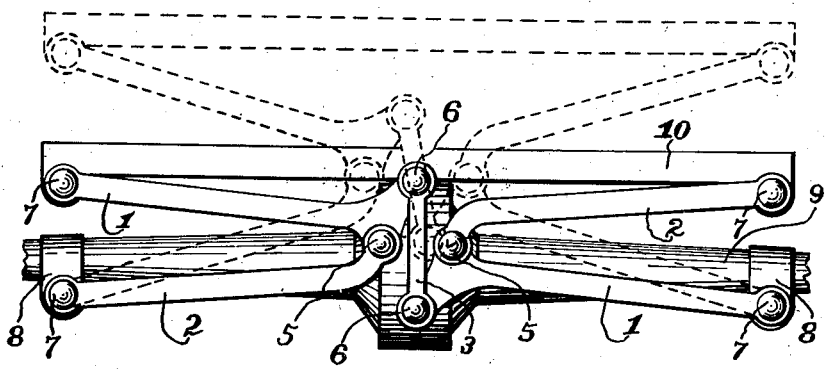
Fig. 3 is a rear elevation showing my device in different positions, exaggerated for the sake of illustration.

It is to be understood that the present form of disclosure is merely for the purpose of illustration and that there may be devised various modifications without departing from the spirit of the invention as herein set forth and claimed.

The double link-couple arrangement between the frame and the axle comprises the links 1 and 2 and the intermediate link 3; the links 1 and 2 being pivotally connected together at their inner ends at the points 5, while the link 3 is pivotally connected to the other link members at the points 6, and the links 1 and 2 are pivotally connected at their outer ends at the points 7 to the straps 8 on the axle housing 9 and to the frame 10. The coil springs are indicated by reference numeral 11, one such spring being provided at each corner of the automobile. These are compression springs and there may be provided also other coil springs for the purpose of taking up any rebound or upward movement of the body with respect to the axle.

As will be observed, the present invention is here illustrated in connection with the rear end of the automobile, and it is to be understood that the same arrangement may be employed at the front end also.

Wherever employed, my device may be recognized as comprising a pair of pivotal link couples upon opposite sides of the longitudinal axis of the automobile, each couple consisting of a link 1 and a link 2 arranged in a re-entrant manner, and the two couples being connected at their inner ends by means of a compensating or co-ordinating link 3 which extends vertically when the body occupies lowered or normal position, and substantially so at all times during normal operation of the device. At each side of the device, the points 7 are disposed in a substantially vertical relation with respect to each other, and the points 5 are disposed in a substantially horizontal manner with respect to each other, this condition being maintained substantially throughout all normal operations. Each side couple of the pivotal links 1 and 2 might be regarded as a toggle joint with a floating connection between the companion couples at their inner ends. Link 3 keeps points 5 practically horizontal.

My device will permit any necessary relative up-and-down movement between the body and axle; but it should be observed that all such movement is within substantially the same vertical plane, so that there is no side-wise movement of the body. In fact, during all of the relative movements between the body and axle, the points 7 will remain in practically vertical alignment with each other. Each couple will respond to any raising or lowering of the wheel on the one side, practically independently of the other couple, at least throughout the range of comparatively slight movement during normal operation of an automobile over a standard roadway. In any case, the device will permit such movement in either direction, the one couple being extended or opened more or less while the other couple is further collapsed to whatever degree may be required under any given circumstances. In fact, under normal operating conditions, one couple will be practically unaffected by the movement of the other couple on the side where the wheel is being raised or lowered.

As already suggested, during the normal operation of the automobile over a standard roadway, there will be but slight opening or closing movement of the couples; and whatever such movement there might be of even the one affected couple, there is co-ordination through the compensating link 3. Thus the companion couples act more or less independently of each other while at the same time there is a complete co-ordination between them. In a word, these companion couples are co-operatively connected in such manner that there is prevented any sidewise movement of the body that would appreciably disturb the normal vertical alignment of the points 7 at each side; while at the same time, this provision does not interfere with the freedom of normal relative up-and-down movement between the body and axle within such vertical plane. This mechanism will respond to any irregularities in the roadway to which either or both of the companion wheels might be subjected at any time, be they of slight or great degree or of the same or different degree for the two wheels at any time, but without permitting any sidewise movement of the body out of its normal vertical plane.

With my present comparatively inexpensive device, it is possible to use the coil springs and at the same time have the benefit of the old leaf springs with respect to the maintaining of the body in the same vertical plane at all times. Thus it is possible to enjoy the advantages of the coil springs together with the advantage of the leaf springs in the respect just mentioned. In other words, there can be realized in the same structure all of the advantages of both forms of springs but without the disadvantages of either; and such a combination is believed to constitute a substantial contribution to the art of automobile construction from the standpoint of riding comfort and reduced wear.

What I claim is:

In an automobile body suspension device, the combination of an axle, a frame, vertically arranged coil springs between said axle and frame, link members pivotally connected at their outer ends to the frame and axle at points in substantially vertical alignment in each instance, said links being pivotally connected in each instance at their inner ends at laterally spaced points so as to form a pair of couples having re-entrant angular arrangement in each instance, said pivotal links being otherwise free of connection with said frame, one of the links of one of said couples having an upward projection and one of the links of the other of said other couples having a downward projection, said projections terminating substantially above and below each other at points above and below the pivotal connections between the link members of the couples, and a substantially vertically disposed auxiliary floating link having exclusively pivotal connection at its ends with the ends of said projections and disposed between the pivotal points of said couples.

SERN L. HANSEN.